ated by the Secretary of the
United States Patent [19]

Ennulat

[11] 4,004,087
[45] Jan. 18, 1977

[54] PANNING PYROELECTRIC VIDICON SYSTEM

[75] Inventor: Reinhard D. Ennulat, Alexandria, Va.

[73] Assignee: The United States of America as represented by the Secretary of the Army, Washington, D.C.

[22] Filed: May 10, 1974

[21] Appl. No.: 468,725

[52] U.S. Cl. .......................... 358/113; 178/DIG. 8; 358/83; 358/206
[51] Int. Cl.² .......................................... H04N 5/38
[58] Field of Search ............ 178/7.2, 7.85, DIG. 8, 178/7.6; 250/333, 334

[56] References Cited

UNITED STATES PATENTS

| | | | |
|---|---|---|---|
| 3,019,292 | 1/1962 | John | 178/7.6 |
| 3,626,091 | 12/1971 | Casper | 178/DIG. 8 |
| 3,715,497 | 2/1973 | Cooper et al. | 178/DIG. 8 |
| 3,761,615 | 9/1973 | Wreathall | 178/7.2 |
| 3,804,976 | 4/1974 | Gard | 178/DIG. 8 X |

Primary Examiner—Benedict V. Safourek
Assistant Examiner—Aristotelis M. Psitos
Attorney, Agent, or Firm—Nathan Edelberg; Max L. Harwell; Robert P. Gibson

[57] ABSTRACT

A pyroelectric vidicon system that converts a still infrared image into thermal and a consequent visible image that is free of flicker or image motion. The required changes of temperature patterns on the retina of the vidicon to observe still images is provided by an optico-mechanical device having reflecting surfaces in which one of the reflecting surfaces moves the infrared image over the retina and another of the reflecting surfaces compensates for this movement by simultaneously moving the visible image projected from a closed circuit television monitor which is viewed by an observer as a still image.

4 Claims, 6 Drawing Figures

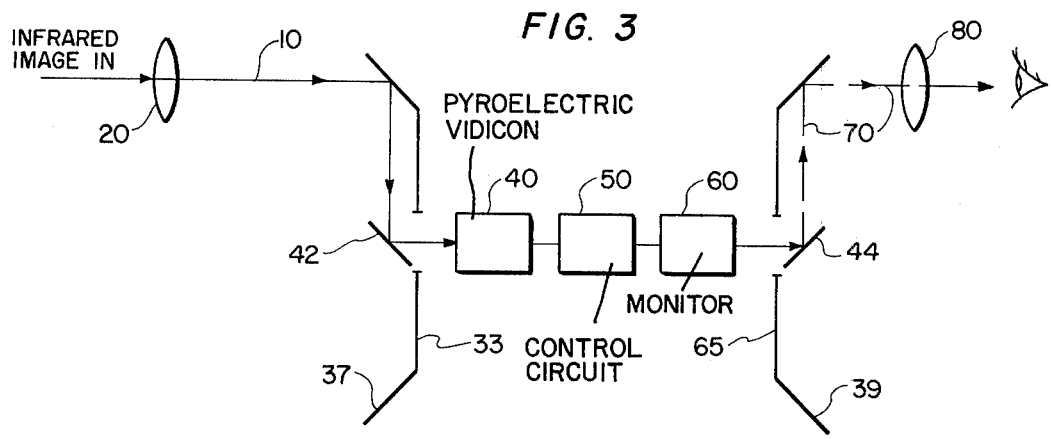
FIG. 3
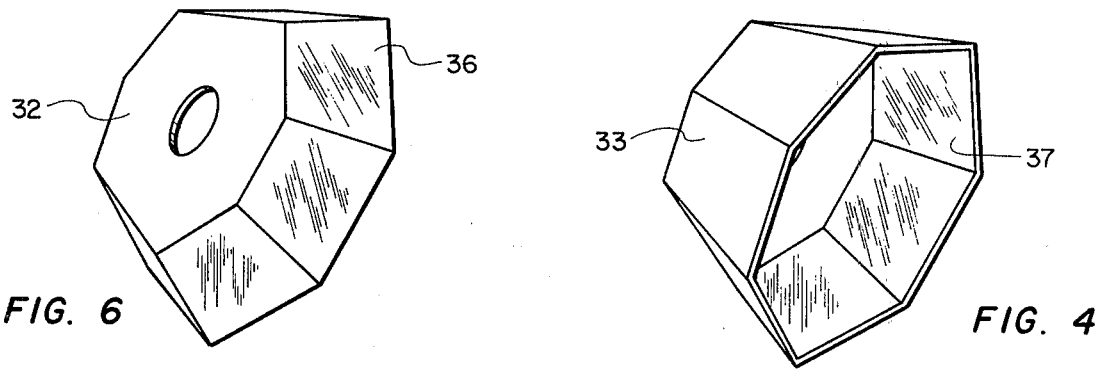
FIG. 6
FIG. 4
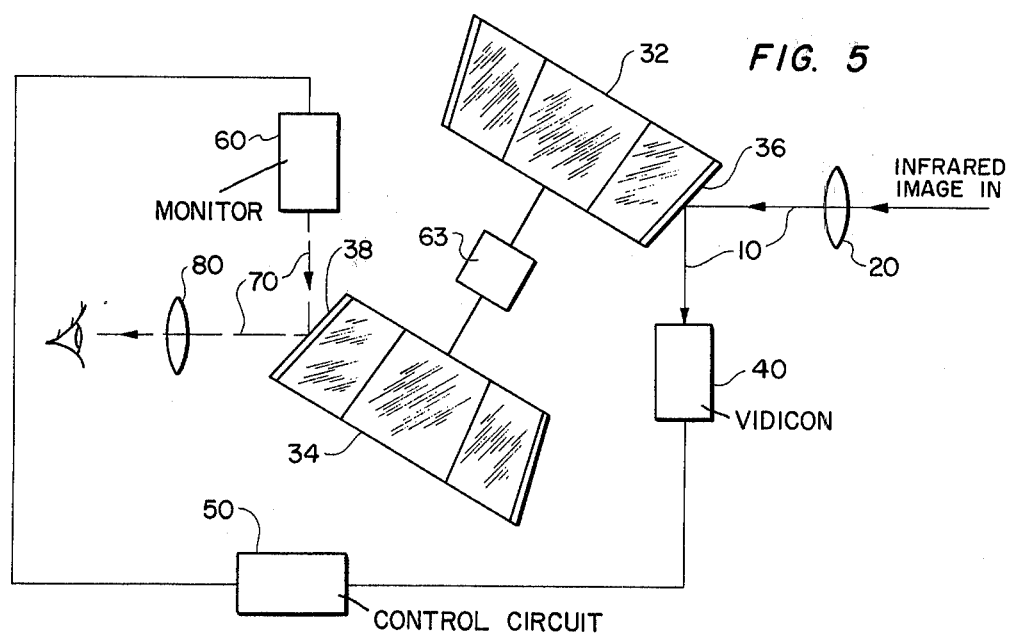
FIG. 5

PANNING PYROELECTRIC VIDICON SYSTEM

The invention described herein may be manufactured, used, and licensed by or for the Government for governmental purposes without the payment to me of any royalty thereon.

BACKGROUND OF THE INVENTION

Pyroelectric vidicons are presently being developed as a low cost alternative to mechanically scanning thermal imaging devices using arrays of cooled infrared detectors. A charge pattern is produced on the surface of the vidicon retina and is read out by the electron beam and neutralized within one frame. In order to obtain charge images and thus video signals for subsequent frames, the temperature pattern on the retina has to be changed between read-outs. Unless the operation of the pyroelectric vidicons is restricted to the imaging of moving objects, the image of incoming infrared radiation must be changed. Prior art pyroelectric vidicons use choppers wherein the charge image must be read out once for the open chopper and once for the closed chopper. Since the frame rate of a conventional television monitor is 30 frames per second, the displayed image will flicker at the rate of 15 cps. To eliminate flicker, the frame rate needs to be increased by a 50 to 100 percent, resulting in higher mechanical burden on the synchronized mechanical chopper.

The present invention comprises optical means of moving the infrared image across the retina and simultaneously stabilize the visible image on a monitor, such as a television.

SUMMARY OF THE INVENTION

The present invention relates to a pyroelectric vidicon system for thermal imaging in a closed circuit television monitor network comprising various novel reflecting surface panning mechanisms. The mechanisms have an input reflecting surface that sweeps a still infrared image over the retina of the vidicon and an output reflecting surface for simultaneously returning the visible image at the output of the monitor back to the original position of the infrared image. Each of the distinct input and output reflecting surfaces are synchronized with each other, and may comprise separate multiple faceted reflecting mirrors or a single flat reflecting mirror with both sides being reflective.

BRIEF DESCRIPTION OF THE DRAWINGS

FIG. 3 illustrates a side view of separate but synchronously rotated input and output panning mirrors operating in conjunction with input and output fixed mirrors;

FIG. 4 is a perspective view of the input panning mirror of FIG. 3;

FIG. 5 illustrates a partially perspective view of synchronously rotated input and output panning mirrors; and FIG. 6 is a perspective view of the input panning mirror or FIG. 5.

DETAILED DESCRIPTION OF THE PREFERRED EMBODIMENTS

Figure 1:
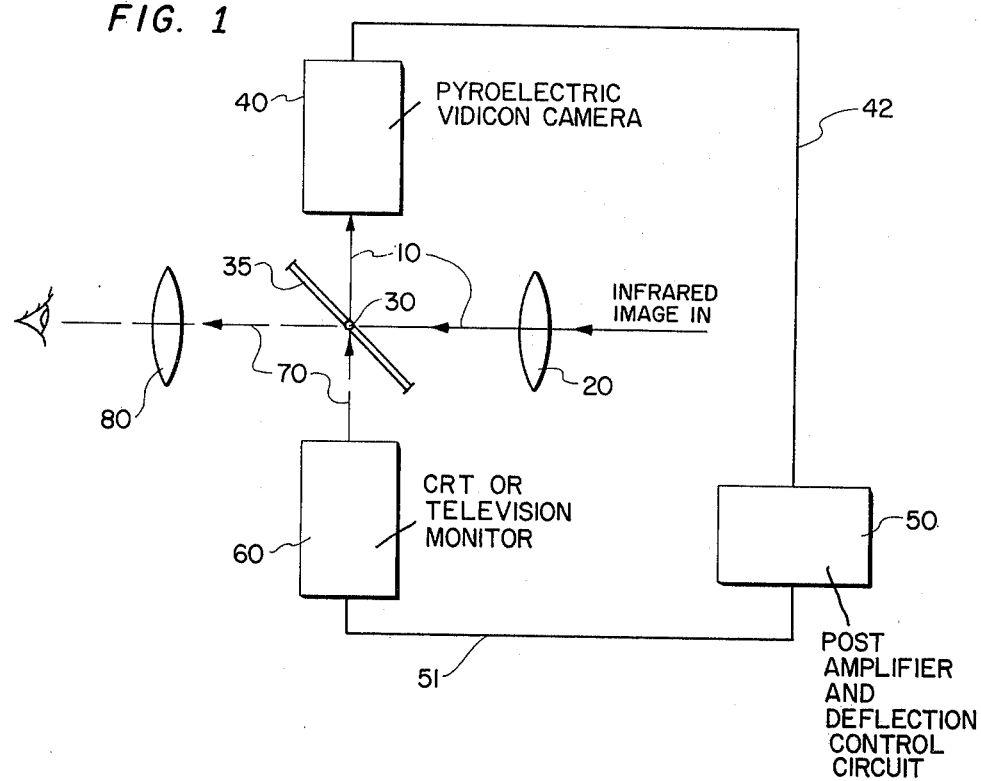
FIG. 1 shows a partial block diagram of a single flat reflecting mirror panning pyroelectric vidicon system according to the present invention.
Figure 2:
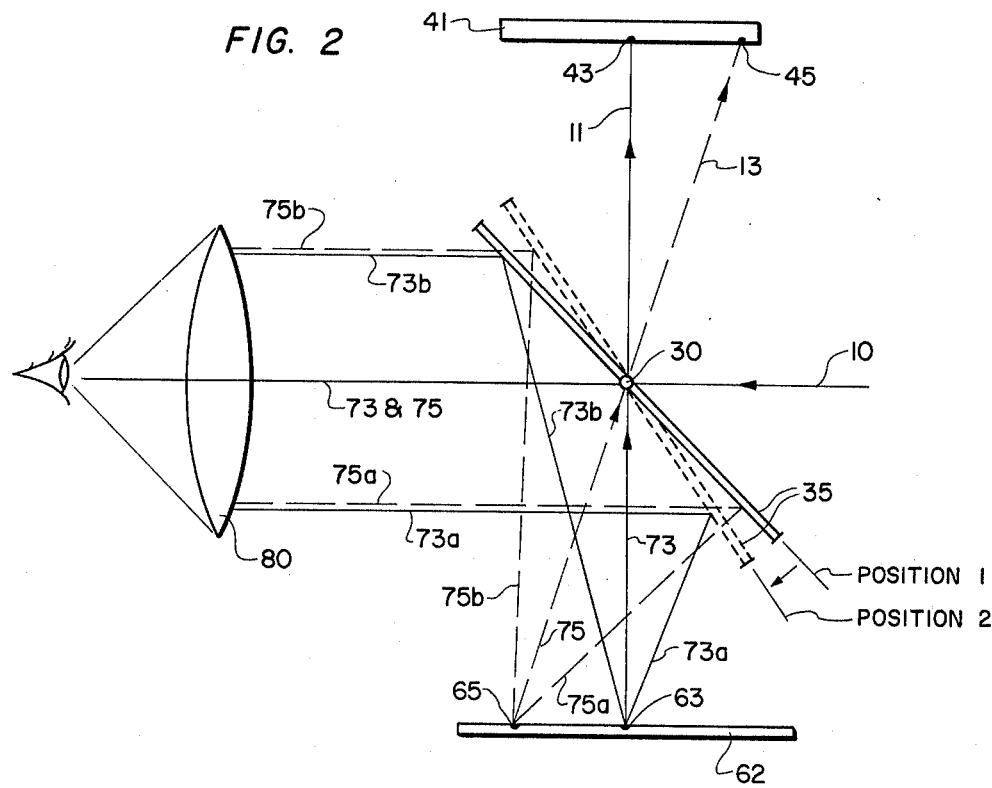
FIG. 2 illustrates a typical sweep pattern of the panning mirror of FIG. 1.

FIGS. 1 and 2 illustrate a single element, two reflective side, flat panning mirror 35 that oscillates about a central axis 30. FIG. 1 shows by partial block diagram the overall system, while FIG. 2 illustrates the sweep patterns that are produced by oscillation of mirror 35.

Looking more closely at both FIGS. 1 and 2, an incoming infrared image projected along optical axis 10 is focussed by infrared optics 20 onto retina 41 of vidicon 40. The incoming infrared image is transmitted by optics designated as a first optical means in each of the present embodiments in this application. The infrared image is reflected off the front surface of a flat panning mirror 35 onto the pyroelectric material retina 41 of pyroelectric vidicon camera 40. The image focused on the retina is converted into an equivalent temperature pattern by absorption, which generates a charge pattern due to the pyroelectric effect of the retina material. The charge pattern is read out by an electron beam from vidicon 40 which generates an electrical signal for subsequent display and viewing on monitor 60, such as a television or cathode ray tube. Control circuit 50 contains the video post amplifier and the deflection electronics which synchronously deflects the electron beam of vidicon 40 and of monitor 60. An observer may view the displayed visible image through eyepiece 80. The visible image observed by an observer is received through optics designated as a second optical means in each of the present embodiments in this application. The charge pattern on retina 41 of the vidicon is neutralized within one frame read-out. If the temperature pattern on the retina is not changed, monitor 60 can only display one frame. Therefore, in order to obtain consecutive charge images, and thus signals for subsequent frames, the temperature pattern on retina 41 must be charged between read-outs. As the mirror 35 oscillates slowly about axis 30, the temperature pattern corresponding to the projected infrared image on retina 41 moves laterally across the retina, and consequently the visible image also moves laterally across the screen of the output of monitor 60. The observer will not notice the image motion as projected through eyepiece 80 if the motion of the image displayed on monitor 60 is exactly compensated for by the angular deflection of panning mirror 35.

FIG. 2 shows the effects from two positions of panning mirror 35. If the panning mirror is in position 1, the incoming optical axis 11 reflected off mirror 35 intersects the vidicon camera retina 41 at point 43. The equivalent point of display on phosphor screen 62 of monitor 60 is at point 63. In position 2 of the panning mirror 35, the incoming optical axis is now along optical axis 13 and the infrared image is centered at point 45. The image is now centrally displayed on phosphor screen 62 at point 65 if the monitor is properly phased with respect to the vidicon. The center and extremities of the visible light rays from point 63 are represented as solid lines 73, 73a, and 73b, respectively. Also, the center and extremities of the rays from point 65 are represented 75, 75a, and 75b, respectively. The image in the focal plane of eyepiece 80 remains at the same plate because the direction and location of the eyepiece optical axis must always coincide with the central rays 73 and 75 of the deflected image points 63 and 65, respectively. The infrared scene in the object plane of infrared optics 20 and the image in the focal plane of eyepiece 80 along with the image on retina 41 and the associated image on screen 62 are always diametrically opposed with respect to central axis 30 of mirror 35. This phenomenon can be seen in FIG. 2 where axes 13 and 75 are directly opposite each side of mirror 35. Furthermore, the infrared image and the visible image are always at rest, while the images on retina 41 and screen 62 are moving in conjunction with panning mirror 35. Since the pyroelectric vidicon 40 only responds to temperature changes on retina 41, large objects of uniform radiance may not be correctly reproduced in the visible spectrum. For example, consider the image of a long rectangle of uniform irradiance that is moved across the retina parallel to its long extension. If this image is translated between read-outs by a fraction of its long extension, temperature variations will occur only in the regions of the short sides of the rectangle. Consequently, the monitor will display only the short sides of the rectangle and nothing in between. This degradation of the image can be eliminated by increasing the speed of the image to the point that it does not overlap during successive read-outs. Since the speed of the image on the retina must be smaller than that of the scanning electron beam, rectangles exceeding a certain length cannot be converted into the visible spectrum. One way to overcome part of this limitation is to also move the rectangle parallel to its short side. These examples are discussed to demonstrate that the speed and path of the image motion, in conjunction with the size and shape of the image object which has uniform radiance, determine the fidelity of thermal images generated by panning pyroelectric vidicons. Thus even if the infrared image has large regions of uniform irradiance, the quality of thermal images from the vidicon is enhanced.

If flat mirror 35 is panned in some closed path along with the oscillatory motion about central axis 30, displays along monitor screen 62 may be swept in a pattern other than the lateral sweep. For example, if both the tilting or panning of axis 30 about the center of the mirror 35 and the oscillation of panning mirror 35 about axis 30 are harmonic and periodic with the same frequency, the image will be moved along an elliptical orbit. Depending on the phasing of both motions, either linear and circular paths can be realized. If tilting and panning occur in phase, the image will move through the center of the retina along a straight line. The direction of the latter is determined by the relative magnitudes of tilting and panning velocity. Slow and periodic variation of the latter causes the image to move essentially along a straight line or rosette-shaped pattern, which rotates slowly about the center of the retina. This mode of operation is of particular importance because the degradation of images containing extensive regions of uniform irradiance will be kept to a minimum.

FIGS. 3 and 4 illustrate a panning mechanism using separate but synchronously rotated input and output panning mirror drums, 33 and 65, respectively. The two synchronously rotating mirror drums 33 and 65 of identified construct have inside faceted mirror elements 37 and 39, respectively in which the faceted mirror elements 37 and 39 are of the exact same size and are aligned with each other. Input panning mirror drum 33 with inside faceted mirror elements 37 are shown in FIG. 4. The incoming infrared image is transmitted through the first optical means by being reflected off one of mirrors 37 onto fixed incoming mirror 42, and by the movement of drum 33 the infrared image is swept across the retina of pyroelectric vidicon 40. Control circuit 50 functions the same as explained above. Visible radiation at the output of monitor 60 is received through the second optical means by being projected through eyepiece 80 to an observer by reflection off fixed exiting mirror 44 and mirrors 39. By proper choice of the successive mounting angles of the inside faceted mirror elements 37, the input panning mirror drum 33 will move the intersection of incoming optical axis 10 with the plane of the vidicon 40 retina along a prescribed path such as an ellipse, a spiral or rectilinear raster. Again, the observer will not notice this image motion if the displayed image on monitor is properly phased by synchronizing inside faceted mirror elements 39 and 37. A synchronous motor (not shown) drives mirrors 33 and 65 at the same speed. Mirror drum 65 and faceted mirror elements 39 are identical to 33 and 37, respectively.

The panning mechanism shown in FIG. 5 operates essentially on the same principle as the panning mechanism of FIG. 3. The major difference is that the faceted mirror elements 36 and 38 are mounted on the outside of drums 32 and 34, respectively, and the fixed deflection mirrors as used in FIG. 3 are not required. The numerals identifying the components in FIG. 5 are identical to those of FIG. 3 except for 63 which represents a common synchronous drive for drums 32 and 34. Input panning mirror drum 32 showing outside faceted mirror elements 36 are shown in FIG. 6.

In summary, all of the panning mechanisms explained above exploit the same principles; i.e. the law of reciprocity of an optical system, the symmetrical arrangement of equivalent optical elements for the infrared and the visible radiation, and the proper electronic phasing of the image motion on vidicon 40 and display monitor 60 by the use of control circuit 50. Axis 10 is depicted as the incoming infrared optical axis and axis 70 is the eyepiece optical axis.

Description of the various embodiments is intended to be illustrative only and the invention is not to be limited to the exact construction shown and described and that various changes and modifications may be made without departing from the spirit and scope of the invention as defined in the appended claims.

I claim:
1. In a pyroelectric vidicon panning system for thermal imaging:
   a first optical means comprising an infrared objective lens and one side of a two reflective side flat panning mirror for panning a still infrared image across a pyroelectric retina of a vidicon for producing a charge pattern therefrom;
   means for generating an electrical signal in accordance with said charge pattern;
   means for converting said electrical signal into a visible display on a monitor for providing a visible image therefrom; and
   a second optical means comprising another side of said two reflective side flat panning mirror and an eyepiece for panning said visible image into a replica of said infrared image for viewing through said eyepiece by an observer.
2. In the pyroelectric vidicon panning system for thermal imaging as set forth in claim 1 wherein said first and second optical means comprise separate but synchronously rotated input and output drums having a multiplicity of faceted mirrors thereon for reflecting the incoming infrared image focused through said in- frared objective lens onto said pyroelectric retina and for reflecting said visible image through said eyepiece.

3. In the pyroelectric vidicon panning system for thermal imaging as set forth in claim 2 wherein said multiplicity of faceted mirrors are positioned on inside beveled edges of said input and output drums and further reflect said infrared image from said input drum off a fixed incoming mirror onto said pyroelectric retina and said visible image is reflected off a fixed exiting mirror and said output drum through said eyepiece.

4. In the pyroelectric vidicon panning system for thermal imaging as set forth in claim 2 wherein said multiplicity of faceted mirrors are positioned on outside beveled edges of said input and output drums.

* * * * *